Patented Sept. 23, 1924.

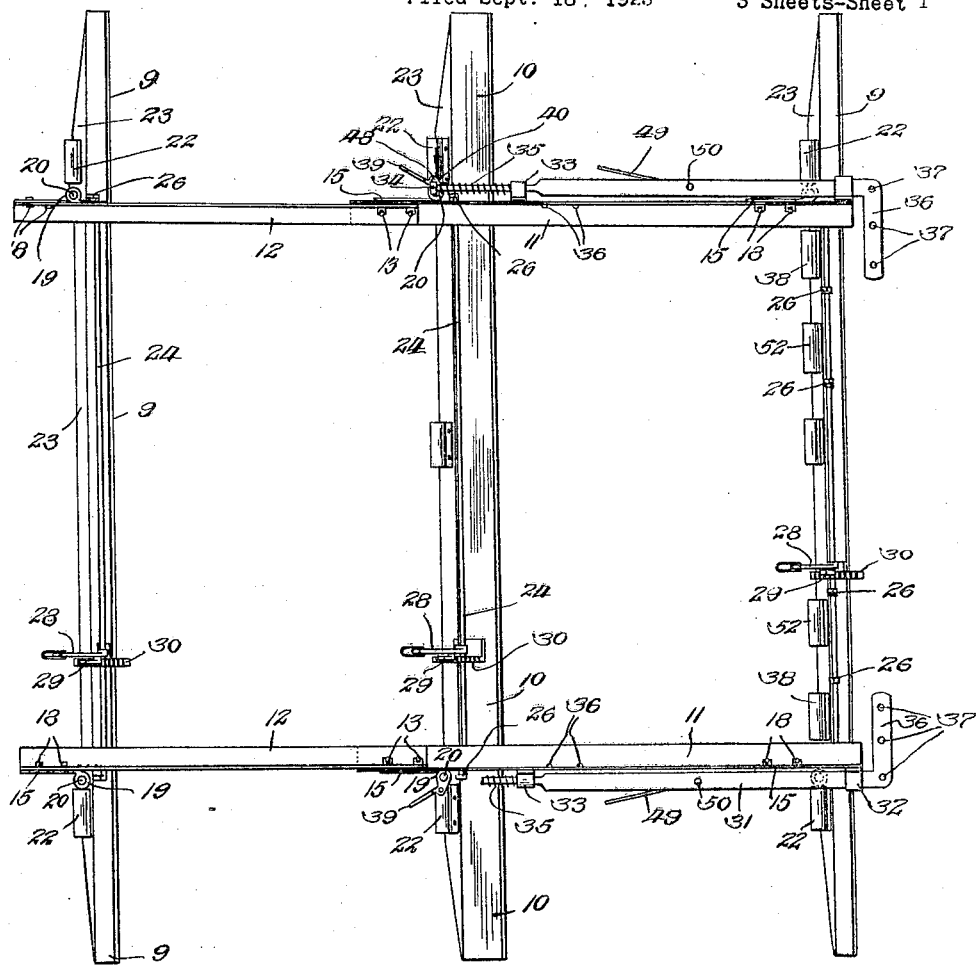
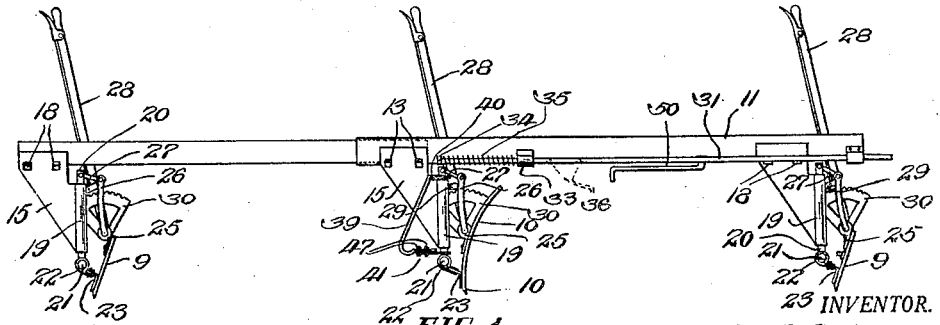

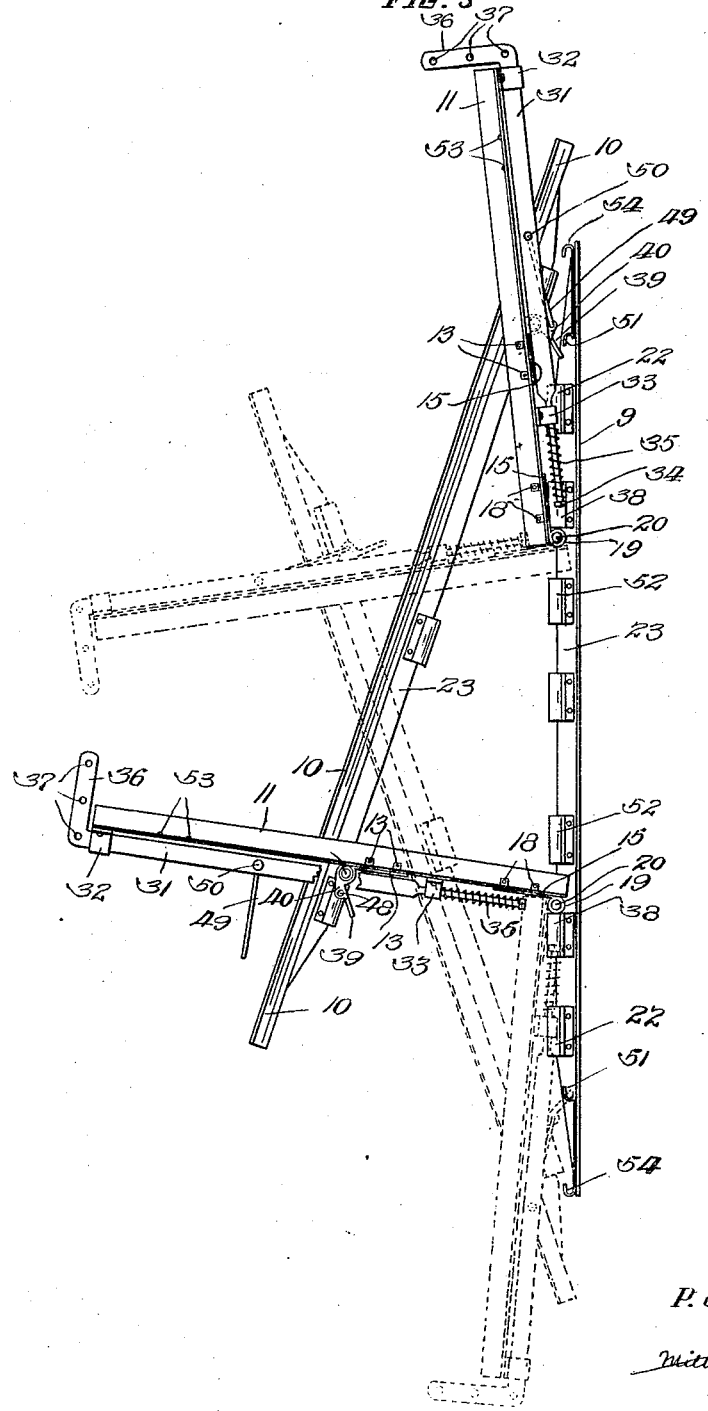

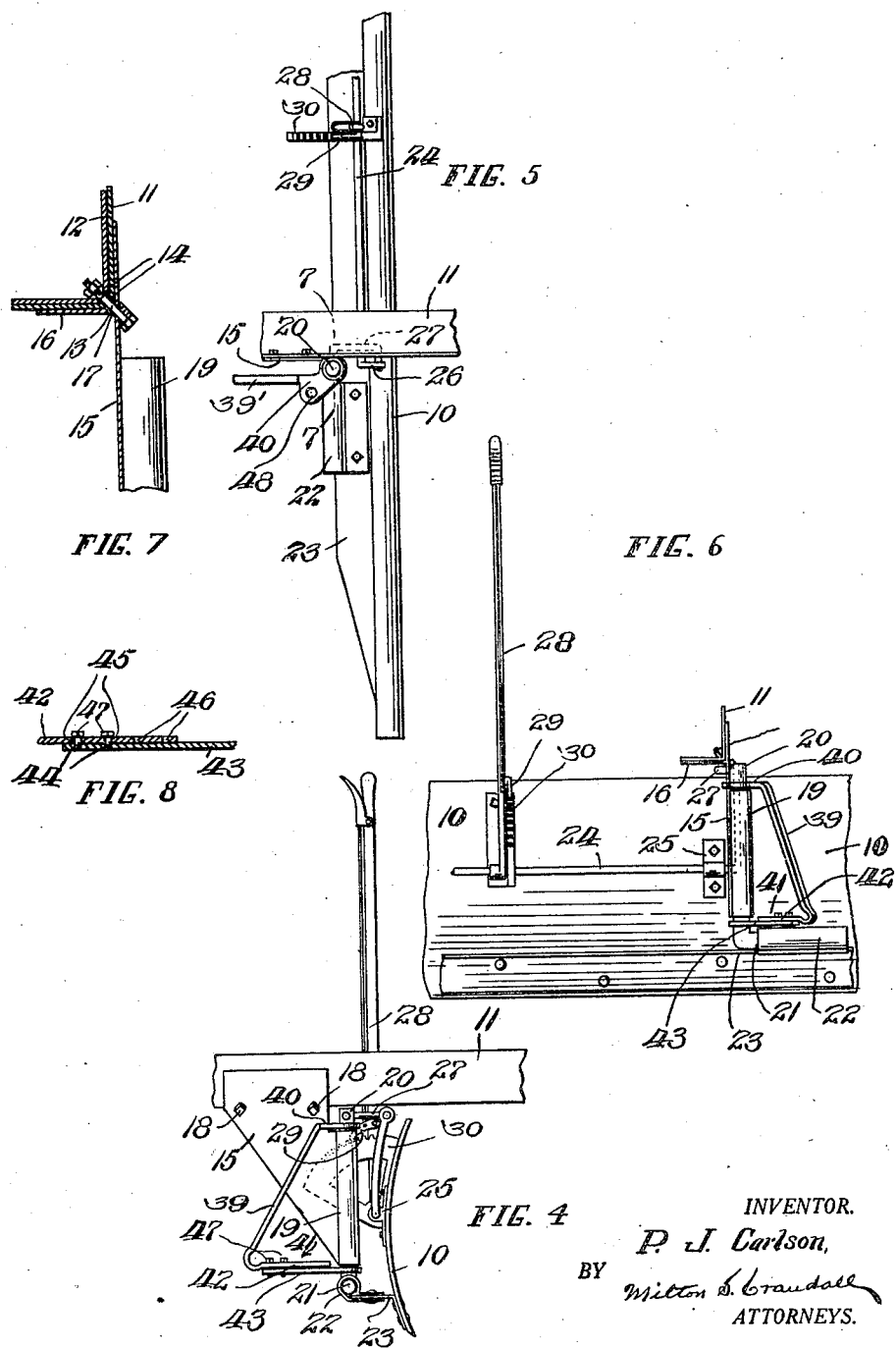

1,509,189

UNITED STATES PATENT OFFICE.

PETER J. CARLSON, OF SIOUX CITY, IOWA.

DRAG.

Application filed September 18, 1923. Serial No. 663,367.

*To all whom it may concern:*

Be it known that I, PETER J. CARLSON, a subject of his Majesty the King of Sweden, and a resident of Sioux City, in the county of Woodbury and State of Iowa, have invented certain new and useful Improvements in Drags, of which the following is a specification.

My present invention provides a drag embodying a pair of scrapers and draft elements so related thereto and connected therewith that when tractive power is applied to both of the draft elements in substantially the same direction, the scrapers will be drawn one behind the other, and the draft will be equalized between the elements and retain the scrapers in substantial parallelism regardless of whether the draft on the said elements is uniform or not.

Furthermore, the invention contemplates a drag particularly adapted for road working and smoothing, and embodying a pair of scrapers adapted to be drawn in substantial parallelism, one behind the other, for working or smoothing the top or crown of a road, and readily convertible into a V-shape to be drawn longitudinally of the direction of travel for working or smoothing the ditches or gutters at the side of the roadway.

The invention has for a further object the production of an improved, readily convertible road and gutter drag which is comparatively simple and inexpensive in manufacture and yet thoroughly efficient and dependable in operation.

Furthermore, the invention, in its preferred embodiment, provides a road drag embodying three normally parallel scrapers arranged one behind the other, and so connected and related to draft beams that one of the scrapers may be readily disconnected from the drag and other minor adjustments made, whereby the draft beams, when tractive power is applied to one thereof in the appropriate direction, will coact to shift the two beams to and hold them in substantially a V-shape to provide a gutter or ditch working implement.

These and other objects and advantages I successfully attain in the embodiment hereinafter described, defined in the appended claims and illustrated in the accompanying drawings which form a part of this application and in which like characters of reference indicate corresponding parts throughout the several views, of which,—

Fig. 1 is a side elevation of the preferred form of the invention.

Fig. 2 is a plan thereof with a part cut away.

Fig. 3 is a plan of the same as converted into a V-shape gutter or ditch drag.

Fig. 4 is an enlarged end elevation of one of the scrapers and associated parts.

Fig. 5 is a plan of the same.

Fig. 6 is a rear elevation of the same.

Fig. 7 is a further enlarged transverse section of one of the supporting beams and bearings taken approximately on the line 7—7 of Fig. 5, and Fig. 8 is a fragmentary longitudinal section of the base of one of the locking elements.

Referring now to the illustrations, the device preferably consists of front and rear elongated flat scrapers, 9, and an intermediate concavo-convex scraper, 10, preferably of greater height than its companions. Extending across the end portions of the scrapers are longitudinal draft beams, each preferably consisting of two overlapping angle irons, 11 and 12, detachably interconnected by suitable bolts, 13, extending diagonally through openings, 14, in the angles of the beams, 11 and 12. To the remote sides of the draft beams are secured depending bearings associated with the respective scrapers, each preferably including vertical plates, 15, adapted to rest against the faces of the draft beams and having horizontally extending flanges, 16, on which the draft beams rest. The said bearings for the intermediate scraper may be secured to the draft beams by the bolts, 13, bolt openings being provided, as at 17, in the angle of the plates, 15, and flanges, 16. The said bearing plates of the front and rear scrapers are secured by similar bolts, 18, which also are extended diagonally through the bearing plates and the associated draft beam members.

The plates, 15, are formed with vertical sleeves, 19, in which are journaled shafts, 20, having horizontal lower end portions, 21, journaled in suitable bearings, 22, on angle irons, 23, secured to the rear sides of the scrapers to stiffen the scrapers and also afford a suitable mounting for the bearings, 22, by means of which construction it is clear that the scrapers may swing horizontally with respect to the beams and also tilt forwardly and rearwardly on the elements, 21. On the rear of each scraper is a horizontal shaft, 24, journaled in suitable bearings, 25, on the scrapers and having upwardly extending arms, 26, pivotally connected by links, 27, with the upper ends of the shafts, 20. Each shaft, 24, is provided with a suitable hand lever, 28, to rock the shaft, 24, and having a suitable detent, 29, engageable with a quadrant, 30, mounted on the associated scraper to hold the scraper at any desired inclination. It will now be clear that the scrapers may be individually tilted forwardly or rearwardly by accordingly shifting the associated levers rearwardly or forwardly.

The draft rigging preferably includes the above-described beams, 11, and bars, 31, positioned on the remote sides of the said beams and slidable forwardly and rearwardly in suitable bearings, 32 and 33, on the beams, 11. The rear end portions of such bars, 31, are preferably reduced and between bosses, 34, on the extreme rear ends thereof, and the bearings, 33, are compression springs, 35, which hold the bars, 31, yieldingly rearwardly extended. The front ends of the bars, 31, are provided with lateral extensions, 36, to which draft animals or other draft power may be hitched, the said extensions being provided with a plurality of openings, 37, in any of which the draft power may be coupled to centralize the draft, as will later more clearly appear.

It will now be evident that when the drag is drawn forwardly through the medium of separate teams or tractive devices hitched to the bars, 31, the scrapers will be held in parallelism and the draft equalized between the two separate draft riggings even though one of the teams or other draft devices pulls ahead of the other.

In converting the device to a V-shape gutter or ditch drag, as presented in Fig. 3, the rear scraper, 9, as shown in Fig. 2, is disconnected by removing the bolts, 13, which connect the beam members, 11 and 12. The bearing members, 15—19, on the rear ends of the beam members, 11, are then moved forwardly a distance and then again secured to the associated beams, 11, by inserting the bolts, 13, through the said bearings and openings, 36, in the said beams. The front scraper, 9, is then turned end for end and placed on the opposite side of the scraper, 10, from that shown in Fig. 1 and Fig. 2 by means of disconnecting the front bearing members, 15, from the beams, 11, and then rebolting them to the said beams through the holes, 14. The pivot members, 21, are then shifted from the bearings, 22, to bearings, 38, on the scraper, 9, which bearings may be identical with the bearings, 22.

With the structure thus adjusted and as clearly shown in Fig. 3, it will be evident that when power is applied laterally to the free end of either of the beams, 11, the beams will coact to shift the scrapers to a V-shape to be drawn longitudinally by the one of such beams to which the power is applied, and the device may be readily shifted or reversed without turning around to travel in the opposite direction by shifting the power to the free end of the opposite beam, 11, whereby it is clear that the scraper, 10, and the beams, 11, will be shifted to the positions shown in broken lines in Fig. 3, thus reversing the V. In this form of the device I provide means for automatically releasably locking the front ends (respecting the direction of travel) of the scrapers together, which means may consist of suitable yokes, represented generally at 39, and including upper horizontal arms, 40, freely mounted on the upper end portions of the posts, 20, of the scraper, 10, and lower arms, 41, freely mounted on the lower end portions of the said posts. The said lower arms, 41, preferably consist of overlapping bars, 42, carried by the web of the yoke, 39, and arms, 43, pivoted on the posts, 20, the said bars, 43, having bolt holes, 44, adapted to be placed in registration with the bolt holes, 45 or 46, in the bars, 42, to receive suitable bolts, 47, whereby the yoke arms, 41, may be extended for a purpose to be hereafter made more clear. The yoke arms, 40, are provided with openings, 48, positioned to receive hooks, 49, suitably pivoted, as at 50, on the respective draft bars, 31, and at a distance from the ends of the scraper, 9, are mounted suitable hooks, 51, positioned for engagement by the yokes, 39, secured to the scraper, 10. By this means when power is applied to the yieldably mounted bar, 31, at the top of Fig. 3, it is clear the associated yoke, 39, will be drawn into engagement with the adjacent hook, 31, whereby the scrapers are held securely against retrograde movement from the V-shape to which they have been shifted; and when it is desired to reverse the device the instant the tractive power is released from the upper bar, 31, it is clear that its compression spring acts to retract the said bar, 31, and disengage the associated yoke, 39, from the hook, whereupon the tractive power may be shifted to the lower draft bar, 31, the V-shaped device then reversed and the above-described yoke, 39, of the said lower beam is finally engaged with the hook, 51, adjacent the lower end of the beam, 9.

As the road gutters vary in width it is desirable that such a device should be adjustable. That is, to separate the free ends of the device further than as shown in Fig. 3. For this purpose I provide bearings, 52, which may be identical with the bearings, 22 and 38, and which are mounted on the scraper, 9, a distance inwardly from the bearings, 38. The intermediate bearings mounted on the beams, 11, are then unbolted from the holes, 36, and rebolted to the said beam, 11, through the bolt holes, 53, adjacent the front ends of the said beams, 11, from which holes the front bearing bolts, 18, were previously removed. Thus it will be seen the free ends of the scrapers will be further spread and the yokes, 39, will be positioned on the opposite sides of the hooks, 49, whereby the hooks instead of pulling the yokes into engagement with the hooks on the scraper, 9, will push them into engagement with the hooks, 54, on the extreme ends of the scraper, 9. To facilitate such adjustment it is also necessary to extend the yoke arms, 41, by removing the bolts, 47, placing the holes, 46, in alignment with the holes, 44, and then re-inserting the bolts.

When desired, the two scrapers, 9 and 10, mounted and connected as above described, may be employed as a road scraper. That is, they may be disposed in parallelism transverse of the roadway with the draft power applied to both bars, 31.

I have not thought it necessary to show the scraper controlling levers and shafts in Fig. 3, but it will be understood that the same mechanism is employed to regulate the inclination of the scrapers when converted to the gutter drag as is shown on the device as adjusted for a road drag. For this purpose I provide the shaft, 24, of scraper, 9, as shown in Fig. 2, with a number of the arms, 26, so positioned on the shaft that when the posts, 20—21, are shifted to the bearings, 38 or 52, the links, 27, may be connected to adjacent ones of such additional arms, 26.

Although I have illustrated and above described but one embodiment of the invention I would not be understood as being limited to such specific construction for various alterations and modifications may be made in the details of construction and arrangement of parts herein disclosed without departing from the spirit and scope of the invention as defined in the appended claims, to-wit:—

1. A convertible road and gutter drag including a pair of scrapers, and draft elements so interconnecting the same that when traction is applied to both of said elements, the scrapers will be drawn one behind the other, and when traction is applied to one of said elements, the scrapers will be shifted to a V-shape, the draft elements being spaced farther apart at their free ends than at their ends connected to the scrapers.

2. A convertible road and gutter drag including a pair of scrapers, and a pair of draft beams so pivoted and related thereto that when traction is applied to both beams in like directions, the scrapers will be disposed transversely of the direction of travel, and when traction is applied to but one of the beams the scrapers will be shifted to a V-shape disposed longitudinally of the direction of travel.

3. A convertible road and gutter drag including a pair of scrapers, and a pair of draft beams so pivoted and related thereto that when traction is applied to both beams in like directions, the scrapers will be disposed transversely of the direction of travel, and when traction is applied to but one of the beams, the beams will coact to shift the scrapers to a V-shape disposed longitudinally of the direction of travel.

4. A road drag embodying a plurality of scrapers arranged one in front of another in substantial parallelism, longitudinal beams thereabove, and means pivotally connecting the beams with the scrapers, including horizontal bearings on the scrapers, vertical bearings on the beams, and posts journaled in the vertical bearings having laterally extending lower end portions journaled in the horizontal bearings.

5. A road drag embodying a plurality of scrapers arranged one in front of another in substantial parallelism, longitudinal beams thereabove, angle irons on the rear sides of the scrapers, and means pivotally connecting the beams with the scrapers, including horizontal bearings on the angle irons, vertical bearings on the beams, and posts journaled in the vertical bearings having laterally extending lower end portions journaled in the horizotal bearings.

6. A road drag embodying a plurality of scrapers arranged one in front of another in substantial parallelism, longitudinal beams thereabove, and means pivotally connecting the beams with the scrapers, including horizontal bearings on the scrapers, vertical bearings on the beams, posts journalled in the vertical bearings having laterally extending lower end portions journalled in the horizontal bearings, and lever operated means coacting with said posts to tilt the scrapers forwardly or rearwardly.

7. A road drag embodying a plurality of scrapers arranged one in front of another in substantial parallelism, longitudinal beams thereabove, angle irons on the rear sides of the scrapers, and means pivotally connecting the beams with the scrapers, including horizontal bearings on the angle irons, vertical bearings on the beams, posts journalled in the vertical bearings having laterally extending lower end portions journalled in the horizontal bearings, and lever operated means coacting with said posts to tilt the scrapers forwardly or rearwardly.

8. A drag embodying scrapers, draft beams thereabove, vertical bearings on the beams, horizontal bearings on the scrapers, posts journaled in the vertical bearings and having lateral extensions on their lower ends journaled in the horizontal bearings, and means for tilting the scrapers including horizontal lever-operated rock shafts on the scrapers, lateral arms on the shafts, and links between said arms and the upper ends of said posts.

9. A convertible road and gutter drag embodying a pair of scrapers, a pair of beams so pivoted to the scrapers that when tractive power is applied to a single one of said beams, the beams will coact to shift the scrapers to a V-shape, draft rigging on and movable with respect to said single beam, and lock elements on the scrapers, governed by movement of the draft rigging to coact in releasably locking the beams against relative movement when shifted to a V-shape.

10. A convertible road and gutter drag embodying a pair of scrapers, a pair of beams so pivoted to the scrapers that when tractive power is applied to either of said beams, the beams will coact to shift the scrapers to a V-shape pointed in the direction of the beam to which the power is applied, draft rigging on the beams yieldably mounted on the beams, and elements on the scrapers governed by movement of the draft rigging, to coact in releasably locking the beams against relative movement when shifted to a V-shape.

11. A drag embodying scrapers, draft beams thereabove, vertical bearings on the beams, horizontal bearings on the scrapers, posts journaled in the vertical bearings and having lateral extensions on their lower ends journaled in the horizontal bearings, and means for individually tilting the scrapers including horizontal rock shafts on the scrapers, lateral arms on the shafts, hand levers on the shafts, and links between said arms and the upper ends of said posts.

12. A road and gutter drag embodying a pair of scrapers, one disposed behind the other, a pair of draft beams pivoted at their rear ends to the rear scraper, and pivoted intermediate of their length to the forward scraper at points spaced farther apart than the pivots connecting the beams and rear scraper, whereby tractive power applied to both beams will pull the drag with the scrapers disposed parallel to each other, and tractive power applied to one beam will shift the scrapers to position in a V-shape.

In testimony whereof, I have hereunto set my hand this 14th day of September, 1923.

PETER J. CARLSON.